US007131628B2

(12) United States Patent
Feinberg et al.

(10) Patent No.: US 7,131,628 B2

(45) Date of Patent: Nov. 7, 2006

(54) VENTED MEMS STRUCTURES AND METHODS

(75) Inventors: Kathleen A. Feinberg, Rochester, NY (US); Peter M. Gulvin, Webster, NY (US); Nancy Y. Jia, Webster, NY (US); Peter J. Nystrom, Webster, NY (US)

(73) Assignee: Xerox Corporation, Stamford, CT (US)

( * ) Notice: Subject to any disclaimer, the term of this patent is extended or adjusted under 35 U.S.C. 154(b) by 62 days.

(21) Appl. No.: 10/901,285

(22) Filed: Jul. 28, 2004

(65) Prior Publication Data

US 2006/0022158 A1 Feb. 2, 2006

(51) Int. Cl.
*F16J 3/00* (2006.01)

(52) U.S. Cl. ........................................................ 251/12

(58) Field of Classification Search .................. 251/12
See application file for complete search history.

(56) References Cited

U.S. PATENT DOCUMENTS

| | | | | |
|---|---|---|---|---|
| 3,513,932 | A * | 5/1970 | Ventre | 180/289 |
| 6,314,986 | B1 | 11/2001 | Zheng et al. | |
| 6,390,603 | B1 | 5/2002 | Silverbrook | |
| 6,527,003 | B1 | 3/2003 | Webster | |
| 6,637,722 | B1 | 10/2003 | Hunnicutt | |
| 6,648,021 | B1 | 11/2003 | Zheng et al. | |
| 6,682,059 | B1 | 1/2004 | Daniels et al. | |
| 2003/0031571 | A1 * | 2/2003 | Yamakawa | 417/412 |
| 2003/0214057 | A1 * | 11/2003 | Huang | 264/1.1 |
| 2004/0124384 | A1 * | 7/2004 | Biegelsen et al. | 251/129.01 |
| 2004/0144242 | A1 * | 7/2004 | Perut et al. | 89/1.14 |

* cited by examiner

*Primary Examiner*—J. Casimer Jacyna
(74) *Attorney, Agent, or Firm*—Gibb I.P. Law Firm, LLC

(57) ABSTRACT

A vent connects a chamber to the external atmosphere surrounding a device to equalize pressure within the chamber. The vent has a size and shape to allow pressure equalization to occur outside a normal operating cycle of the chamber and controls the pressure to prevent undesirable deflection of a membrane within the chamber and ensure proper operation of the device.

14 Claims, 2 Drawing Sheets

VENTED MEMS STRUCTURES AND METHODS

BACKGROUND AND SUMMARY

MicroElectroMechanical Systems (MEMS) are systems that are micromachined in silicon and can be integrated with electronic microcircuits. MEMS generally fall into the two categories of microsensors and microactuators, depending on application, and in operations are based on electrostatic, electromagnetic, thermoelastic, piezoelectric, or piezoresistive effects.

MEMS often include a closed chamber, sealed membrane, or other fluid passageway and this can be found to be susceptible to differential pressure. This pressure difference can occur during various stages in a device lifetime from processing, storage, shipping to operation. The pressure difference can be caused by trapped pressure, temperature change, outgassing of materials or active operation (such as pumping or priming). The pressure difference can include bulging or collapsed membranes, trapped bubbles or fluids, or even failures such as cracking or bursting.

According to various exemplary embodiments a method of forming a MEMS is provided that forms an actuator and a first (lower) chamber to maintain the actuator. A vent is formed connecting the first chamber to the external atmosphere surrounding the system to equalize pressure within the first chamber or to allow pressure equalization to occur outside a normal operating cycle of the sealed actuator chamber. A flexible member is formed at the top of the first chamber and a second chamber is formed above the first chamber. The second chamber can be adapted to maintain a fluid, such as ink for an ink jet printing device. The flexible member separates the first chamber from the second chamber. A nozzle opening can be formed at the top of the second chamber to allow the fluid to be expelled from the nozzle when the actuator operates. Note that although a fluid ejector is described, this can be applied to any membrane system where the differential pressure needs to be managed.

According to various exemplary embodiments a MEMS has at least one vent connected to at least one sealed actuator chamber. The vent is formed to include a chamber (e.g., lollipop-shaped chamber) that has a size and shape to allow pressure equalization to occur outside a normal operating cycle of the sealed actuator chamber. A plurality of sealed actuator chambers can be connected to a single vent and, for example, the sealed actuator chambers can be positioned in one or more rows with vents positioned at ends of the rows. A vent passage connects the sealed actuator chamber to the vent. The vent can also comprise a conduit for electrical conductor lines. The vent can include a ruptured sacrificial membrane that is opened to connect the vent with the atmosphere surrounding the MEMS.

These and other features are described in, or are apparent from, the following detailed description of various exemplary embodiments of systems and methods.

DETAILED DESCRIPTION

The structures and methods in the embodiments herein provide a micro-fluidic structure that is vented to atmosphere or to allow pressure equalization to occur outside a normal operating cycle of the sealed actuator chamber. By connecting individual or collections of chambers to a passageway leading to a controlled pressure, such as atmosphere, failure mechanisms can be eliminated.

Figure 1:
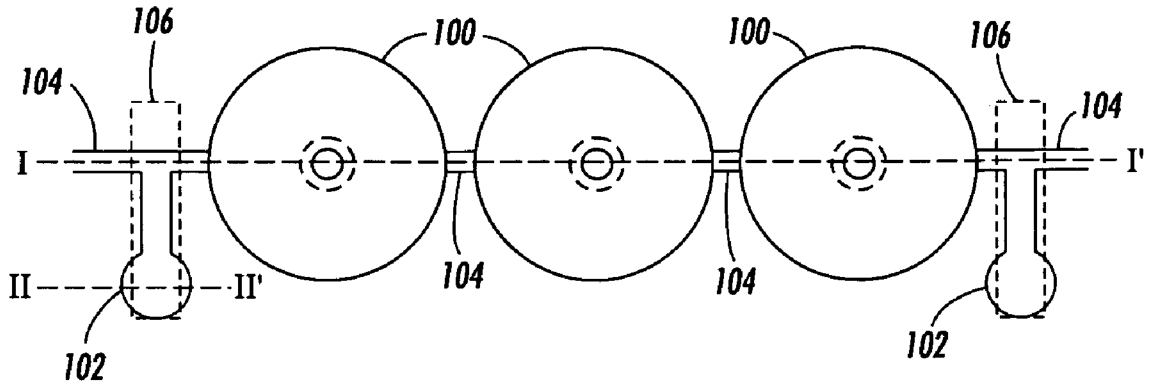
FIG. 1 is a schematic top-view diagram of a row of sealed actuator chambers having vents.
Figure 2:
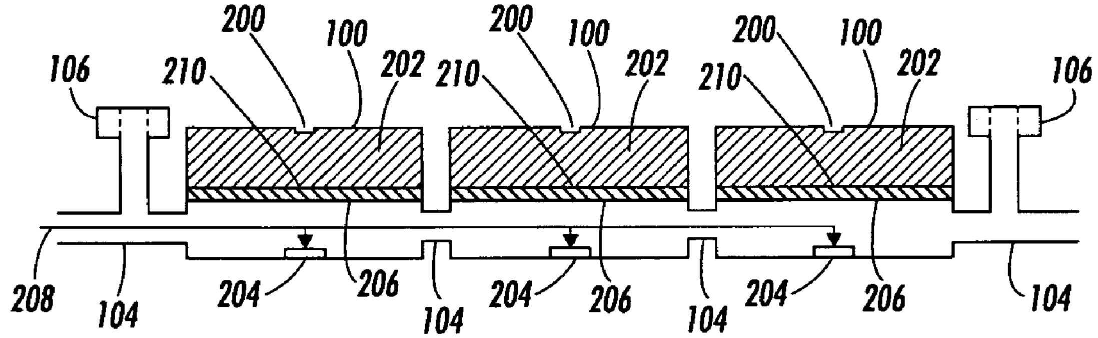
FIG. 2 is a schematic cross-sectional view diagram of a row of sealed actuator chambers having vents.
Figure 3:
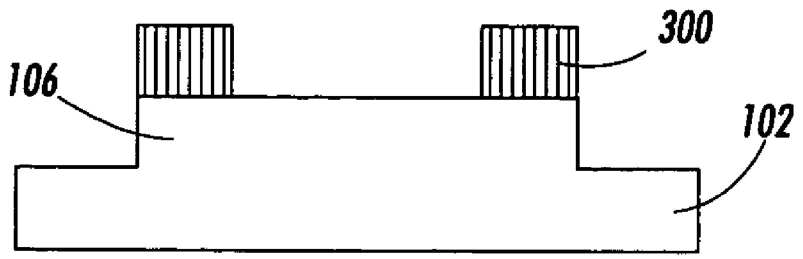
FIG. 3 is a schematic cross-sectional view diagram of a vent structure.
Figure 4:
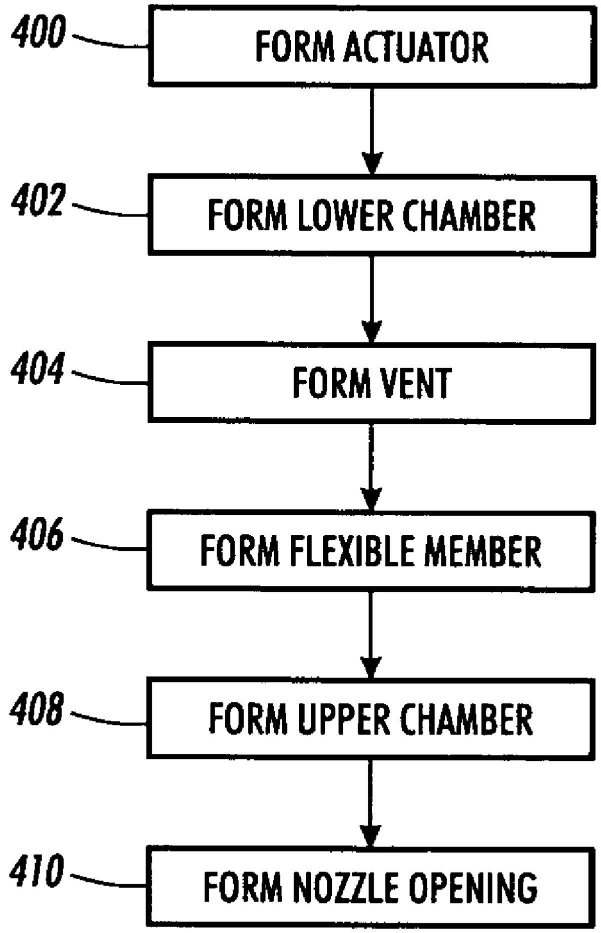
FIG. 4 is a flow diagram showing the flow of embodiments.

More specifically, various embodiments are shown in schematic form in FIGS. 1–3 and in flowchart form in FIG. 4. FIG. 2 is a cross-sectional view along line I–I' in FIG. 1 and FIG. 3 is a cross-sectional view along line II–II' in FIG. 1. This structure can be formed using any material and any processing whether now known or developed in the future. For example, the structure can be formed of a standard polymer, or single crystal silicon polysilicon and can be formed using standard photolithographic patterning and etching processes. See, for example, the manufacturing processes discussed in U.S. Pat. No. 6,390,603 to Silverbrook, which is fully incorporated herein by reference. Embodiments herein can include deep reactive ion etching (RIE) to pass the ports through the back side of the die, metal electroform channels or tubes, injection molded channel structures bonded to the surface of the wafer, and others. Note that the venting structures shown are merely examples, and can be extended to any fluidic structure.

According to various exemplary embodiments each sealed actuator chamber 100 is formed to have a standard actuator or electrode such as those mentioned above 204 (flowchart item 400) and a first (lower) chamber 206 (flowchart item 402) to maintain the actuator 204. A vent 102 (flowchart item 404) is formed to connect the first chamber 206 to the external atmosphere surrounding the MEMS to equalize pressure within the first chamber 206 or to allow pressure equalization to occur outside a normal operating cycle of the sealed actuator chamber. A flexible member 210 (flowchart item 406) is formed at the top of the first chamber 206 and a second (upper) chamber 202 is formed above the first chamber 206 (flowchart item 408). The second chamber 202 can be adapted to maintain a fluid, such as ink for an ink jet printing device. The flexible member 210 separates the first chamber 206 from the second chamber 202. A nozzle opening 200 can be formed at the top of the second chamber 202 (flowchart item 410) to allow the fluid to be expelled from the nozzle when the actuator 204 operates.

This produces a MEMS that has at least one (potentially hundreds, thousands, or more) vent 102 connected to at least one (potentially hundreds, thousands, or more) sealed actuator chamber 100. One feature is that the vent is formed to include a chamber 102 (e.g., lollipop-shaped chamber) that has a size and shape to allow pressure equalization to occur outside a normal operating cycle of the sealed actuator chamber 100. In general, the specific vent geometry is not constrained to a particular shape and will vary depending upon the specific implementation. Thus, any number of shapes and sizes of venting structures could be used to equalize the chamber pressure, as described herein.

Multiple sealed actuator chambers 100 can be connected to a single vent 102, or multiple vents 102 can be connected to each sealed actuator chamber 100. In the example shown in FIG. 1, the sealed actuator chambers 100 are positioned in one or more rows with vents 102 positioned at ends of the rows.

A vent passage 104 can connect the sealed actuator chamber 100 to the vent 102 and/or adjacent chambers 206 to one another. The vent 102 can also comprise a conduit for at least one electrical conductor line 208. In FIG. 2, each actuator 204 is electrically isolated and can be controlled independently. This passageway 104 can be connected to secondary passages 106 to further communicate to the controlled pressure. The secondary passages 106 can be above or below the primary passageway 104.

As shown in FIG. 3, the vent 102 can include a ruptured sacrificial membrane 300 that is opened to connect the vent 102 with the secondary passageways 106 that are, in turn, connected to the atmosphere surrounding the MEMS or some other pressure constant source. These passageways 106 and/or vent chambers 102 can be selectively opened before, during or after processing (e.g., by rupturing the sacrificial membrane 300) to facilitate device yield and processing constraints.

In the example shown in the drawings, the small circular area or "lollipop" is the outlet vent 102 structure. The lollipop can be sealed until sufficient processing steps are complete, after which the sacrificial membrane 300 is punctured by methods including laser ablation and mechanical probing. The vent 102 is sealed with the membrane 300 to prevent blockage during subsequent water level processing, such as spin on polymer patterning. This second layer will form a vertical groove 106 connecting all the rows of each die. This groove 106 will then be covered by a layer of another material, such as Polyimide. This groove 106 will be left open at atmosphere. In the case of an ink jet printing device, this polymer layer groove will be routed off to the side of the die to prevent any unwanted contamination or ink to interfere with the venting process. To complete this structure, a secondary polymer film such as Polyimide or similar film can be applied to cover the groove 106 and complete the passageway 106 to the edge of the die. Variations on these embodiments could include other photoimageable layers or materials, metal film or sheets, or even silicon or glass structures.

While some embodiments are described with reference to an ink-jet printer, one ordinarily skilled in the art would understand that embodiments herein are not strictly limited to ink jet printers. Rather, any device that uses sealed chambers is contemplated by this disclosure, including, but not limited to a micro pump, or other fluid or media moving or sensing device. The example shown in the drawings has an active polysilicon membrane 210 over a circular electrode 204. This lower electrode (actuator) 204 can have a charge applied to it to attract the suspended membrane 210 towards it. When the charge is released, the membrane 210 springs back to its natural position. When a fluid structure is formed around and over this membrane 210, the forces generated during the membrane 210 release eject a droplet of ink through the nozzle opening 200 onto a piece of media. By varying the design of this type of structure, a wide variety of small pumps, chambers, and sensors could be created.

If the chamber 100 does not have the correct pressure in place, it may not operate properly. Too much or too little pressure can deflect the membrane 210 in an undesirable manner. For example, if the membrane 210 is displaced from its equilibrium position, the effective amplitude of the device will be reduced. The vent 102 has a size and shape to allow pressure equalization to occur outside a normal operating cycle of the sealed actuator chamber 100 and controls the pressure below the membrane 210 to prevent undesirable deflection of the membrane and ensure proper operation of the device. The controlled pressure below the membrane 210 produced by the vent 102 can also be put to good use in the operation of the device itself, for example by increasing pressure to modify behavior of the device.

Additionally, these passageways 106 and/or vent chambers 102 are sized to allow venting, but prevent crosstalk or inadvertent communication between adjacent membranes or structures. In other words, the vent 102 and secondary passages 104, 106 are large enough to allow pressure equalization between the lower chamber 206 and the external atmosphere over longer periods of time (seconds, minutes); however, the vent 102 and secondary passages 106 are small enough to maintain the momentary vacuum/pressure conditions for the shorter periods (fraction of a second, milliseconds, etc.) that the actuator 204 operates. Thus, the vent passage can be sized to match the performance of the device, if so desired, to provide, for example a proper dampening effect. If the vent 102 and passageway 104, 106 are made small enough, the resistance to the flow of air can be increased to impact backpressure on the membrane 210 only over the time constant of operation. Over the longer term, slow changes in atmospheric pressure allow the air to move freely. By maintaining the momentary vacuum/pressure during the relatively shorter periods when the actuator 204 operates, the vent 102 prevents crosstalk and inadvertent communication between the different actuator chambers 100.

The vents 102 prevent pressure differences between the atmosphere and the internal chambers of a sealed actuator that can cause bulging or collapsed membranes, trapped bubbles or fluids, or even failures such as cracking or bursting and thereby improve performance. Devices that do not specifically require venting to operate properly may also be improved by increased manufacturing latitudes or tolerances using the vents 102. Thus, according to various exemplary embodiments the chamber device manufacturing process and resulting structure is improved, which leads to improved yield and reduced cost.

While the foregoing has been described in conjunction with various exemplary embodiments, it is to be understood that many alternatives, modifications, and variations would be apparent to those skilled in the art. Accordingly, Applicants intend to embrace all such alternatives, modifications and variations that follow in this spirit and scope.

What is claimed is:

1. A device comprising:

a sealed actuator chamber comprising a flexible member and an actuator separate from said flexible member; and a vent connected to said sealed actuator chamber, wherein said vent includes a ruptured sacrificial membrane.

2. The device according to claim 1, wherein a plurality of sealed actuator chambers are positioned in a row and vents are positioned at ends of said row.

3. The device according to claim 1, further comprising a vent passage connecting said sealed actuator chamber to said vent.

4. The device according to claim 1, wherein said vent comprises a conduit for at least one electrical conductor line.

5. The device according to claim 1, wherein said vent is open to the atmosphere surrounding said device.

6. A method of forming a device comprising:

forming at least one sealed actuator chamber to have a flexible member and an actuator separate from said flexible member; and forming a vent connected to said sealed actuator chamber, wherein said process of forming said vent includes rupturing a sacrificial membrane to open said vent.

7. The method according to claim 6, wherein said process of forming said vent comprises forming vents at ends of a row of said sealed actuator chambers.

8. The method according to claim 6, further comprising forming a vent passage connecting said sealed actuator chamber to said vent.

9. The method according to claim 6, wherein said process of forming said vent comprises utilizing said vent as a conduit for at least one electrical conductor line.

10. The method according to claim 6, wherein said process of forming said vent opens said vent to the atmosphere surrounding said device.

11. A system comprising:

a first chamber adapted to maintain a fluid;

a sealed actuator chamber below said first chamber;

an actuator within said sealed actuator chamber;

a flexible member separating said first chamber from said sealed actuator chamber; and a vent connected to said sealed actuator chamber adapted to equalize pressure within said sealed actuator chamber, wherein said vent includes a ruptured sacrificial membrane.

12. The system according to claim 11, wherein a plurality of sealed actuator chambers are positioned in a row and vents are positioned at ends of said row.

13. The system according to claim 11, further comprising a vent passage connecting said sealed actuator chamber to said vent.

14. The system according to claim 11, wherein said vent comprises a conduit for at least one electrical conductor line.

* * * * *